(12) United States Patent
Hoh et al.

(10) Patent No.: US 8,100,211 B2
(45) Date of Patent: Jan. 24, 2012

(54) ELECTROCHEMICAL ACCUMULATOR AND VEHICLE COMPRISING AN ELECTROCHEMICAL ACCUMULATOR

(75) Inventors: Markus Hoh, Garbsen (DE); Joerg Birkholz, Sarstedt (DE); Martin Wiegmann, Borstel (DE)

(73) Assignee: Johnson Controls Hybrid and Recycling GmbH, Hannover (DE)

( * ) Notice: Subject to any disclaimer, the term of this patent is extended or adjusted under 35 U.S.C. 154(b) by 0 days.

(21) Appl. No.: 12/875,694

(22) Filed: Sep. 3, 2010

(65) Prior Publication Data

US 2011/0056758 A1    Mar. 10, 2011

Related U.S. Application Data

(63) Continuation of application No. PCT/EP2009/001460, filed on Mar. 2, 2009.

(30) Foreign Application Priority Data

Mar. 7, 2008    (DE) .......................... 10 2008 013 188

(51) Int. Cl.
*B60R 16/04* (2006.01)
(52) U.S. Cl. ........................................ 180/68.5; 429/120
(58) Field of Classification Search ..................... 429/61, 429/164, 148, 120, 181, 99, 94, 83, 204; 180/68.5
See application file for complete search history.

(56) References Cited

U.S. PATENT DOCUMENTS

| 2,042,806 A | 1/1900 | Schulte |
| 2,416,079 A | 1/1900 | Anthony |
| 4,189,473 A | 2/1980 | Cole et al. |
| 4,278,744 A * | 7/1981 | Athearn .......................... 429/181 |
| 4,554,221 A | 11/1985 | Schmid |
| 4,957,829 A | 9/1990 | Holl |
| 5,336,570 A | 8/1994 | Dodge, Jr. |
| 5,606,238 A | 2/1997 | Spellman et al. |
| 5,866,276 A | 2/1999 | Ogami et al. |
| 5,879,833 A | 3/1999 | Yoshii et al. |

(Continued)

FOREIGN PATENT DOCUMENTS

DE    10328582    1/2004

(Continued)

OTHER PUBLICATIONS

European Search Report for European Application No. 09012377.9, dated Dec. 22, 2009, 10 pages.

(Continued)

*Primary Examiner* — Hau Phan
(74) *Attorney, Agent, or Firm* — Foley & Lardner LLP

(57) ABSTRACT

An electrochemical accumulator includes a plurality of electrochemical cells, each of which has a casing. The accumulator also includes a cover, a housing which is closed by the cover, an electrolyte in the housing, and at least one connecting pole for making electrical contact with the accumulator, where the connecting pole is electrically connected to a group of the electrochemical cells. The accumulator also includes a cooling air area for holding cooling air for cooling the cells and a degassing area for holding a gas which emerges from the cells in the event of a defect. The cooling air area and the degassing area are separated from one another in a gas-tight manner and the cooling air area and the degassing area are passed out of the housing independently of one another. The cooling air area has channels which are guided on the casings of the cells outside the cells.

17 Claims, 5 Drawing Sheets

U.S. PATENT DOCUMENTS

| | | | |
|---|---|---|---|
| 6,001,501 A | 12/1999 | Collie | |
| 6,007,937 A * | 12/1999 | Ruiz Rodriguez et al. | 429/94 |
| 6,106,972 A | 8/2000 | Kokubo et al. | |
| 6,221,524 B1 * | 4/2001 | Andrew et al. | 429/94 |
| 6,265,091 B1 | 7/2001 | Pierson et al. | |
| 6,379,831 B1 | 4/2002 | Draper et al. | |
| 6,379,837 B1 | 4/2002 | Takahashi et al. | |
| 6,410,184 B1 | 6/2002 | Horiuchi et al. | |
| 6,410,185 B1 | 6/2002 | Takahashi et al. | |
| 6,465,123 B1 | 10/2002 | Baumann et al. | |
| 6,472,098 B1 | 10/2002 | Sawada et al. | |
| 6,528,206 B2 * | 3/2003 | Ruiz Rodriguez et al. | 429/204 |
| 6,537,694 B1 * | 3/2003 | Sugiura et al. | 429/120 |
| 6,541,154 B2 | 4/2003 | Oogami et al. | |
| 6,558,835 B1 | 5/2003 | Kurisu et al. | |
| 6,632,560 B1 * | 10/2003 | Zhou et al. | 429/99 |
| 6,656,632 B2 | 12/2003 | Asaka et al. | |
| 6,858,345 B2 | 2/2005 | Amine et al. | |
| 6,896,995 B2 | 5/2005 | Saito | |
| 6,923,837 B2 | 8/2005 | Longhi et al. | |
| 6,932,651 B2 | 8/2005 | Mita et al. | |
| 6,953,638 B2 | 10/2005 | Inui et al. | |
| 7,014,949 B2 | 3/2006 | Kanai et al. | |
| 7,045,236 B1 * | 5/2006 | Andrew et al. | 429/83 |
| 7,094,496 B2 | 8/2006 | Rodriguez et al. | |
| 7,129,001 B2 | 10/2006 | Munenaga et al. | |
| 7,147,963 B2 | 12/2006 | Kimoto et al. | |
| 7,160,643 B2 | 1/2007 | Kunimoto et al. | |
| 7,189,474 B2 | 3/2007 | Hamada et al. | |
| 7,270,576 B2 | 9/2007 | Kim et al. | |
| 7,291,421 B2 * | 11/2007 | Kimura et al. | 429/120 |
| 7,351,493 B2 | 4/2008 | Uemoto et al. | |
| 7,604,896 B2 * | 10/2009 | Maguire et al. | 429/160 |
| 2001/0046624 A1 | 11/2001 | Goto et al. | |
| 2004/0038123 A1 | 2/2004 | Hisamitsu et al. | |
| 2004/0062955 A1 | 4/2004 | Kubota et al. | |
| 2004/0175612 A1 | 9/2004 | Conti | |
| 2005/0048365 A1 | 3/2005 | Miyahisa et al. | |
| 2005/0079408 A1 | 4/2005 | Hirano | |
| 2005/0100783 A1 | 5/2005 | Ro et al. | |
| 2005/0170239 A1 * | 8/2005 | Uemoto et al. | 429/120 |
| 2005/0174092 A1 | 8/2005 | Dougherty et al. | |
| 2005/0287427 A1 | 12/2005 | Kim et al. | |
| 2006/0040173 A1 | 2/2006 | Shimamura et al. | |
| 2006/0063067 A1 * | 3/2006 | Kim | 429/148 |
| 2006/0073378 A1 | 4/2006 | Hamery et al. | |
| 2006/0073379 A1 | 4/2006 | Kim et al. | |
| 2006/0078789 A1 | 4/2006 | Wegner | |
| 2006/0162149 A1 | 7/2006 | Ha et al. | |
| 2006/0177734 A1 | 8/2006 | Yao | |
| 2006/0204840 A1 | 9/2006 | Jeon et al. | |
| 2006/0216582 A1 | 9/2006 | Lee et al. | |
| 2006/0216583 A1 | 9/2006 | Lee et al. | |
| 2006/0234119 A1 | 10/2006 | Kruger et al. | |
| 2006/0246350 A1 | 11/2006 | Takayama et al. | |
| 2007/0015050 A1 | 1/2007 | Jung et al. | |
| 2007/0026303 A1 | 2/2007 | Jeon et al. | |
| 2007/0026305 A1 | 2/2007 | Jeon et al. | |
| 2007/0026306 A1 | 2/2007 | Lee et al. | |
| 2007/0026739 A1 | 2/2007 | Kim et al. | |
| 2007/0037051 A1 | 2/2007 | Kim et al. | |
| 2008/0160395 A1 | 7/2008 | Okada et al. | |
| 2009/0075158 A1 | 3/2009 | Rudorff et al. | |
| 2009/0111015 A1 * | 4/2009 | Wood et al. | 429/164 |
| 2010/0183904 A1 | 7/2010 | Muis | |

FOREIGN PATENT DOCUMENTS

| | | | |
|---|---|---|---|
| DE | 102005047034 | | 4/2006 |
| EP | 0 607 675 B1 | | 7/1994 |
| EP | 1 109 237 A1 | | 6/2001 |
| EP | 1 213 784 A2 | | 6/2002 |
| EP | 1 250 720 B1 | | 5/2006 |
| EP | 1 786 051 A1 | | 5/2007 |
| EP | 1935699 | | 6/2008 |
| FR | 2058740 | A5 | 5/1971 |
| FR | 2585185 | A1 | 1/1987 |
| GB | 2 136 629 | A | 9/1984 |
| JP | 2003308823 | A | 10/2003 |
| JP | 2007012487 | A | 1/2007 |
| JP | 2007280831 | A | 10/2007 |
| WO | WO2007043691 | | 4/2007 |
| WO | WO2007118437 | | 10/2007 |
| WO | WO 2007/134198 A1 | | 11/2007 |
| WO | WO 2008/021230 A2 | | 2/2008 |
| WO | WO 2008/074034 A1 | | 6/2008 |
| WO | WO 2008/086417 A2 | | 7/2008 |
| WO | WO 2008/098193 A2 | | 8/2008 |
| WO | WO 2009/016476 A2 | | 2/2009 |
| WO | WO 2010/019764 A2 | | 2/2010 |
| WO | WO 2010/085636 A2 | | 7/2010 |

OTHER PUBLICATIONS

International Preliminary Report on Patentability, Written Opinion of the International Searching Authority and International Search Report for International Application No. PCT/US2007/017785, dated Mar. 3, 2008, 15 pages.

International Preliminary Report on Patentability for International Application No. PCT/IB2008/001984, dated Feb. 2, 2010, 6 pages.

International Search Report for International Application No. PCT/US2007/068716, dated Oct. 17, 2007, 5 pages.

International Search Report for International Application No. PCT/IB2008/001984, dated Feb. 4, 2009, 2 pages.

International Search Report for International Application No. PCT/US2010/021791, dated Aug. 13, 2010, 3 pages.

Office Action for Chinese Application No. 200780025271.0 with English translation, dated Sep. 8, 2010, 4 pages.

Office Action of Chinese Application No. 200780029735.5 with English translation, dated Jun. 25, 2010, 10 pages.

Office Action for European Application No. 07836697.8, mail date Aug. 31, 2009, 2 pages.

Response to Office Action for European Application No. 07836697.8, dated Jan. 6, 2010, 6 pages.

Office Action for European Application No. 07836697.8, dated Feb. 17, 2010, 3 pages.

Response to Office Action for European Application No. 07836697.8, dated Jun. 25, 2010, 9 pages.

Office Action for European Application No. 07783619.5, dated Jul. 29, 2009, 4 pages.

Office Action for European Patent Application No. 07783619.5, dated Jan. 31, 2011, 61 pages.

Response to Office Action for European Application No. 07783619.5, dated Feb. 5, 2010, 9 pages.

Office Action for European Application No. 09012377.9, dated Jun. 1, 2010, 1 page.

Response to Office Action for European Application No. 09012377.9, dated Sep. 28, 2010, 14 pages.

Office Action for European Application No. 09012377.9, dated Oct. 7, 2010, 3 pages.

Response to Office Action for European Application No. 09012377.9, dated Feb. 10, 2011, 5 pages.

Written Opinion of International Application No. PCT/US2007/068716, dated Oct. 17, 2007, 6 pages.

International Search Report with English translation for International Application No. PCT/EP2009/001460, dated May 25, 2009, 6 pages.

Written Opinion for International Application No. PCT/EP2009/001460, dated May 25, 2009, 6 pages.

* cited by examiner

ELECTROCHEMICAL ACCUMULATOR AND VEHICLE COMPRISING AN ELECTROCHEMICAL ACCUMULATOR

CROSS-REFERENCE TO RELATED PATENT APPLICATIONS

This application is a Continuation of International Application No. PCT/EP2009/001460, filed Mar. 2, 2009, which claims priority to German Patent Application DE 10 2008 013 188.1, filed Mar. 7, 2008. The entire disclosures of International Application No. PCT/EP2009/001460 and German Patent Application DE 10 2008 013 188.1 are incorporated herein by reference.

BACKGROUND

The invention relates to an electrochemical accumulator (referred to for short in the following text as an accumulator). The invention also relates to a vehicle having an electrochemical accumulator.

High-power accumulators with high energy densities in the electrochemical cells are used in particular in hybrid vehicles (for example a vehicle with an accumulator and a fuel cell) and in electrical vehicles (for example electrical road vehicles).

The high energy densities lead to a large amount of heat being developed. In order to maintain the performance of the accumulators and allow them to guarantee a wide operating window (which is governed, for example, by the outside temperatures), effective cooling is needed for the accumulators.

Effective and furthermore cost-effective cooling of the accumulators is achieved by air cooling. For air cooling, cooling air channels are provided between the individual cells in the accumulator, through which cooling air channel cooling air is passed with the aid of a fan.

It is known for the cooling air which is available for cooling of the accumulator to be taken from the air-conditioned passenger compartment. Particularly in countries with high annual average temperatures, the use of the outside air is ineffective. Furthermore, when using the outside air, filter systems are required in order to remove contamination (for example sand) from the cooling air before the cooling air is passed through the accumulator.

This increases the costs of these cooling systems.

High-power accumulators with high energy densities require not only effective cooling but also a safety system to protect the accumulator against an excessive gas pressure in the cells. The excessive gas pressure in the cells can lead to sudden reactions within the cells, and to ignition of the cells. This can result in people being injured, and the environment being damaged.

By way of example, bursting openings (weak points) are integrated in the cell walls as a safety system against excessive gas pressure in the cells. These weak points can prevent an explosion in the cells in the event of damage (for example a short circuit, overcharging, mishandling) which is associated with excessive gas pressure in the cells. The cells open in defined conditions (a specific gas pressure in the cells) and in this case dissipate the excessive gas pressure that has occurred within the cells. The gas which escapes through the opened weak points in this case leaves the accumulator via the cooling air channels. The gases emerging from the cells are hazardous to health.

One object of the present invention is to provide a high-performance and safe electrochemical accumulator, which can be used in particular in hybrid vehicles and electrical vehicles. A further object of the present invention is to provide a vehicle having a high-power electrochemical accumulator which is safe for the user.

SUMMARY

An exemplary embodiment relates to an electrochemical accumulator that includes a plurality of electrochemical cells, each of the electrochemical cells having a casing. The electrochemical accumulator also includes a cover, a housing which is closed by the cover, an electrolyte in the housing, and at least one connecting pole for making electrical contact with the accumulator, where the connecting pole is electrically connected to a group of the electrochemical cells. The electrochemical accumulator also includes a cooling air area for holding cooling air for cooling the cells and a degassing area for holding a gas which emerges from the cells in the event of a defect. The cooling air area and the degassing area are separated from one another in a gas-tight manner and the cooling air area and the degassing area are passed out of the housing independently of one another. The cooling air area has channels which are guided on the casings of the cells outside the cells.

Another exemplary embodiment relates to a vehicle having an electrochemical accumulator, a passenger compartment, and a fan configured to pass cooling air from the passenger compartment into the electrochemical accumulator. The electrochemical accumulator includes a plurality of electrochemical cells, each of the electrochemical cells having a casing. The electrochemical accumulator also includes a cover, a housing which is closed by the cover, an electrolyte in the housing, and at least one connecting pole for making electrical contact with the accumulator, where the connecting pole is electrically connected to a group of the electrochemical cells. The electrochemical accumulator also includes a cooling air area for holding cooling air for cooling the cells and a degassing area for holding a gas which emerges from the cells in the event of a defect. The cooling air area and the degassing area are separated from one another in a gas-tight manner and the cooling air area and the degassing area are passed out of the housing independently of one another. The cooling air area has channels which are guided on the casings of the cells outside the cells.

BRIEF DESCRIPTION OF THE DRAWINGS

The invention will be explained in more detail with reference to one exemplary embodiment, which is illustrated in the following figures, in which.

DETAILED DESCRIPTION

Figure 1:
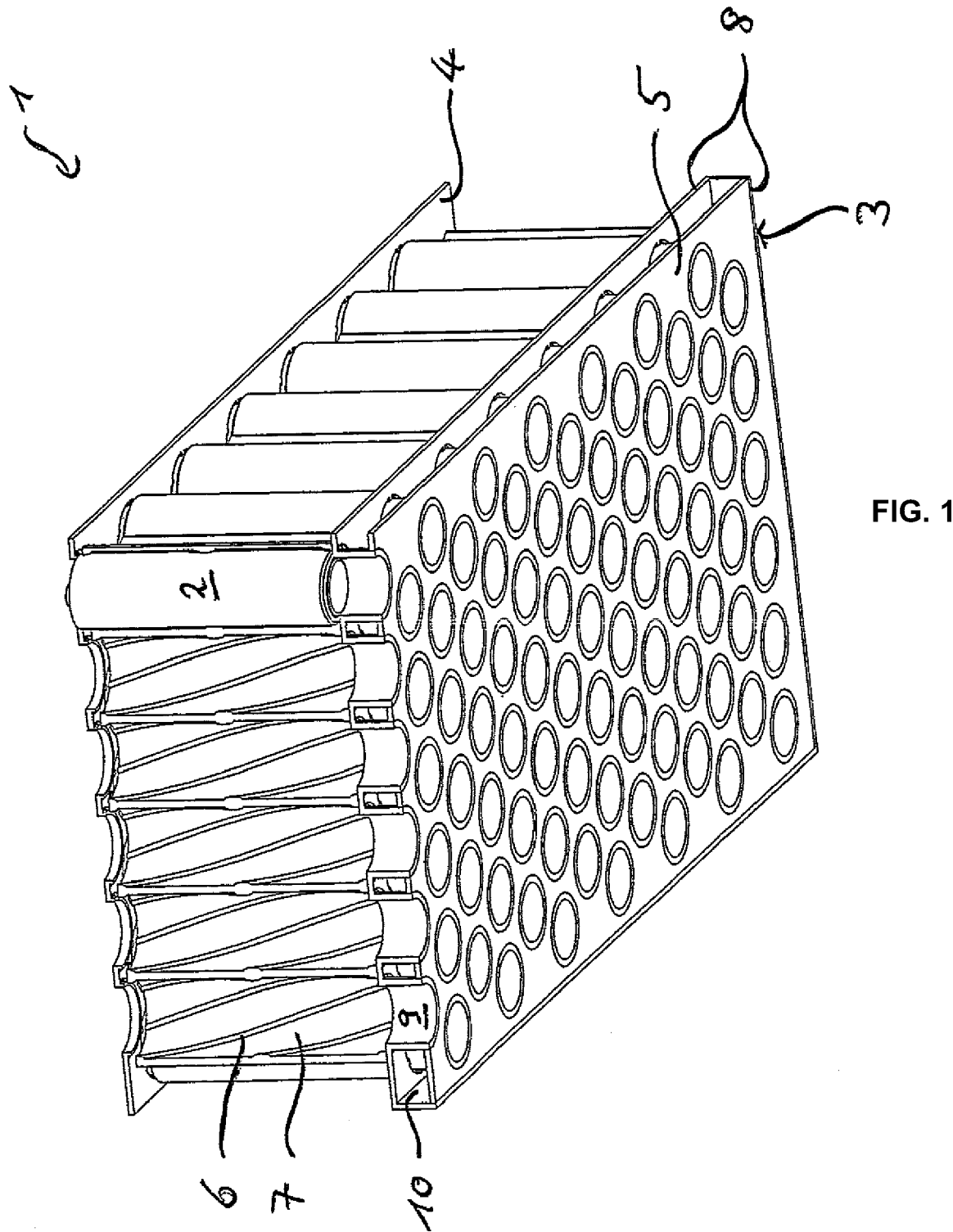
FIGS. 1 and 2 show two perspective views of a module having a multiplicity of electrochemical cells.

The accumulator according to the invention avoids the risk of gas emerging from the cells entering the passenger compartment via the cooling air area, where it would endanger people located there, in that the cooling air area and the degassing area are separated from one another in a gas-tight manner, and the cooling air area and the degassing area are passed out of the housing independently of one another.

This design prevents gas emerging from the cells from entering the cooling circuit, and, from there, the passenger compartment.

The strict physical separation of the cooling system and degassing system avoids the complex valve or flap mechanisms which are required for known air-cooled accumulators, which are used to separate the cooling system from the passenger compartment. The lack of the valve or flap mechanisms furthermore improves the air-cooling efficiency, since the valve or flap mechanisms create resistances for the cooling air. Furthermore, the accumulator according to the invention avoids the need for a separate cooling system from the degassing system, with its own heat exchangers, which ensure that the cooling air is at the required inlet temperature. Because of the high production costs of a separate cooling system such as this, the accumulator according to the invention represents a cost-effective alternative.

The cells in the accumulator according to the invention are preferably cylindrical. Thin-film electrodes are expediently used for the cylindrical form of the cells, which are first of all stacked and are then introduced in a wound form into the cylindrical cell. This design allows large active electrode areas to be accommodated in a small space, thus increasing the capacity of the accumulator.

In one embodiment, the cooling air area has channels which are guided on the casings of the cylindrical cells outside the cells. This embodiment allows direct contact between the cooling system and the cells, thus achieving effective cooling. Furthermore, a plurality of channels carrying cooling air can be passed around each individual cell.

In a further embodiment, the degassing area comprises cylindrical areas which are arranged outside the cells on the base surfaces or the corner surfaces of the cells. This design makes it possible to provide the bursting openings on the base surfaces or the covering surfaces of the cells. Furthermore, this arrangement of the degassing area allows simple separation of the cooling air area and of the degassing area from one another in cylindrical cells.

The invention provides that the cells have bursting openings via which the internal areas in the cells are connected to the degassing area such that gas can escape from the internal areas in the cells into the degassing area. The bursting openings are used as a pressure-relief valve and specifically dissipate the gas from the internal areas in the cells into the degassing area.

In one special embodiment, the bursting openings are closed by bursting membranes which allow gas to be let out of the internal areas in the cells when there is a defined excess pressure in the internal areas of the cells. The bursting membranes can be designed such that they break open at a specific excess pressure. However, it is also feasible for them to act as a pressure-relief valve, which closes automatically again when the pressure in the internal area of the cell has fallen below a predefined value.

In one special embodiment, a support is provided in the housing, in which the cells are fixed in the assembled state.

A very high-performance accumulator is obtained by the cells being in the form of lithium-ion cells.

According to the invention, a vehicle is provided which is equipped with an accumulator according to the invention.

The cooling air is expediently passed out of the passenger compartment into the accumulator by means of a fan. The fan can be arranged between the accumulator and the passenger compartment such that the cooling air from the passenger compartment is forced through the accumulator. However, it is also feasible for the fan to be arranged behind the accumulator such that the cooling air from the passenger compartment is drawn from the accumulator. The word "behind" means that the accumulator is arranged between the fan and the passenger compartment. The fan produces suction both through the accumulator and through the passenger compartment, such that the cooling air is drawn through it.

It is particularly advantageous for the vehicle according to the invention to be a hybrid vehicle or an electrical vehicle because these vehicles require high-performance accumulators. The vehicle according to the invention may be a land vehicle, watercraft or aircraft.

FIG. 1 shows a module on a multiplicity of electrochemical cells 2 (referred to for short in the following text as cells).

The cells 2 are cylindrically wound round cells. The wound arrangement comprises a positive electrode (not illustrated) and a negative electrode (not illustrated) with a separator located between them, as well as a non-aqueous electrolyte. In the present case, the cells 2 are lithium-ion cells.

The cells 2 are fixed in a support 3. The support 3 is made of plastic.

The support 3 has a single base 4 and a double base 5. The single base 4 and the double base 5 are connected to one another via webs 6 such that they are separated and are located parallel to one another. A channel 7 is in each case formed between two webs 6. The channels 7 form a cooling air area in the accumulator according to the invention. Cooling air can be passed through the channels 7 in order to cool the cells 2, for example with the aid of a fan.

The double base 5 comprises two plates 8 which are arranged parallel and at a distance from one another.

Cylindrical casings 9 are arranged between the plates 8, forming cylindrical areas. A casing 9 is provided for each cell 2.

Side air inlets 10 for supplying the cooling air are provided in the double base 5.

The air inlets 10 at the edge of the module 1 are broader than the air inlets 10 which are not arranged at the edge of the module.

Figure 2:
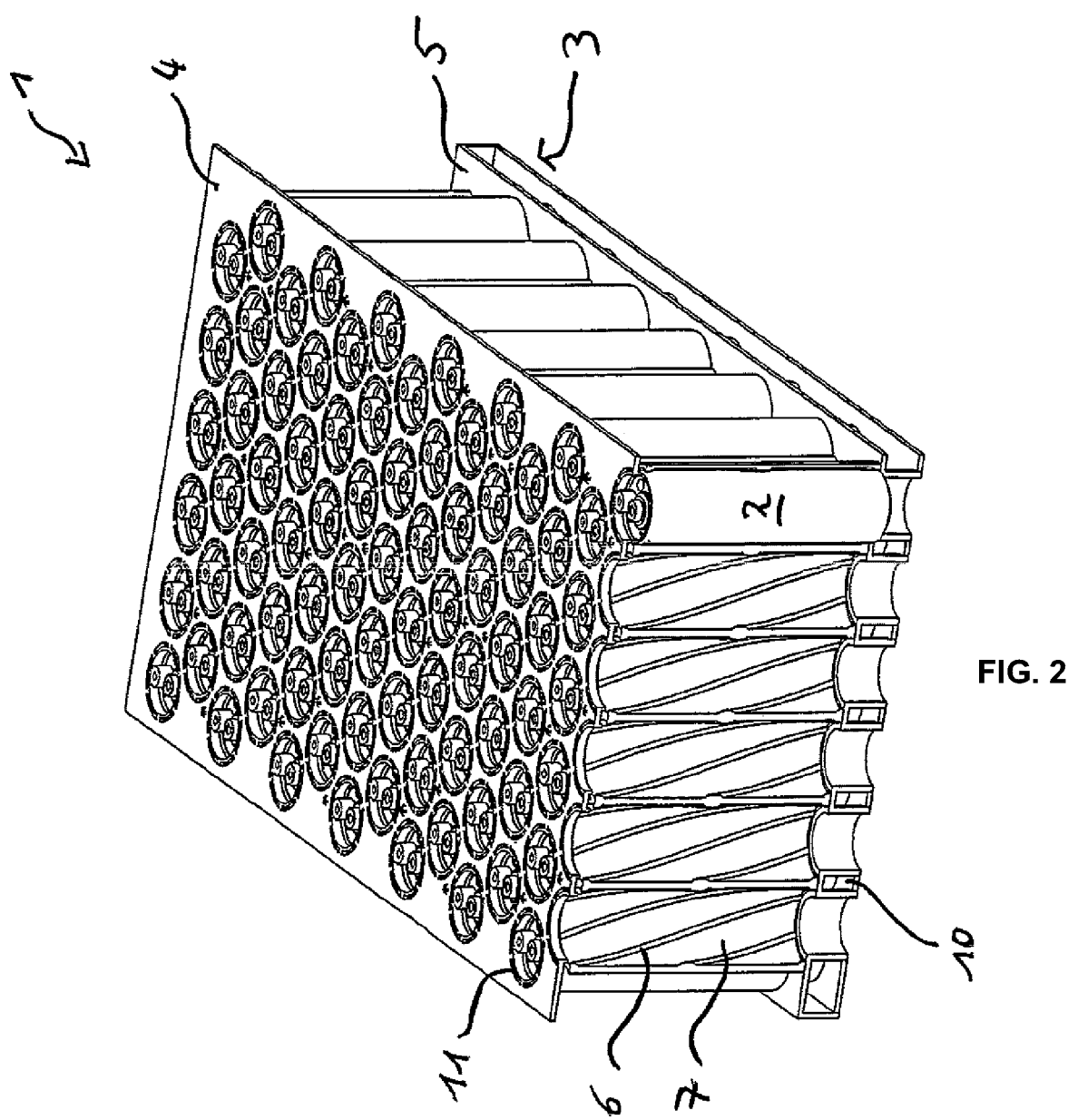

In FIG. 2, outlet slots 11 can be seen in the single base 4. Cooling air which enters through air inlets 10 and flows through the channels 7 can emerge again through the outlet slots 11. One channel 7 in each case opens in one outlet slot 11. In the present case, six channels 7, each having six outlet slots 11, are provided around each cell. The outlet slots 11 are arranged cylindrically around the cells 2, and are each of the same length. The outlet slots 11 and the channels 7 may, of course, also have different lengths.

On the one hand, the webs 6 separate the individual channels from one another, and on the other hand they are used for fixing the individual cells 2.

Figure 3:
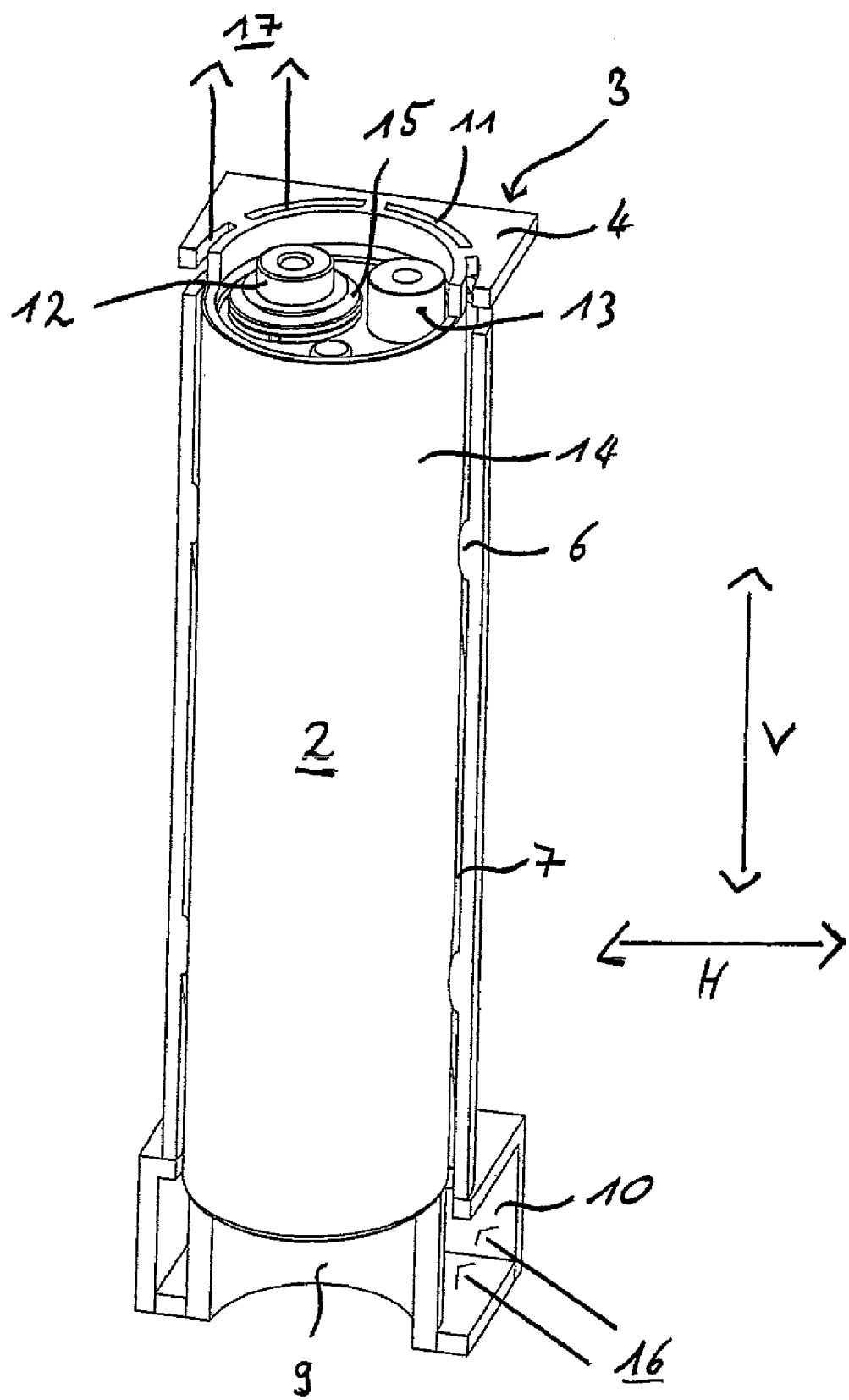
FIGS. 3, 4 and 5 show three perspective views of an electrochemical cell in the module shown in FIGS. 1 and 2.

FIG. 3 shows an enlarged illustration of a single cell 2.

The cell 2 has a positive pole 12 and a negative pole 13. The negative pole 13 is electrically connected to the casing 14 of the cell 2. The positive pole 12 is electrically isolated from the casing 14 by an insulating ring 15. The positive pole 12 is electrically connected to the positive electrode in the cell 2.

For the sake of clarity, only about half of that part of the support 3 which runs around the cell 2 illustrated in FIG. 3 is illustrated; the front part of the support, as seen in FIG. 3, has been omitted.

The cell 2 is fixed in the support 3 between the single base 4 and the upper plate 8 of the double base 5 such that it cannot move relative to the support 3 in the vertical direction V.

The cell 2 is fixed by the webs 6 in the horizontal direction H.

Cooling air which flows into the air inlet 10 is indicated by arrows 16. The cooling air flows in a helical shape along the channels 7 to the outlet slots 11. The cooling air leaves the support 3 at the outlet slots 11; this is indicated by arrows 17.

Approximately half of the cylindrical casing 9 can be seen in FIG. 3.

Figure 4:
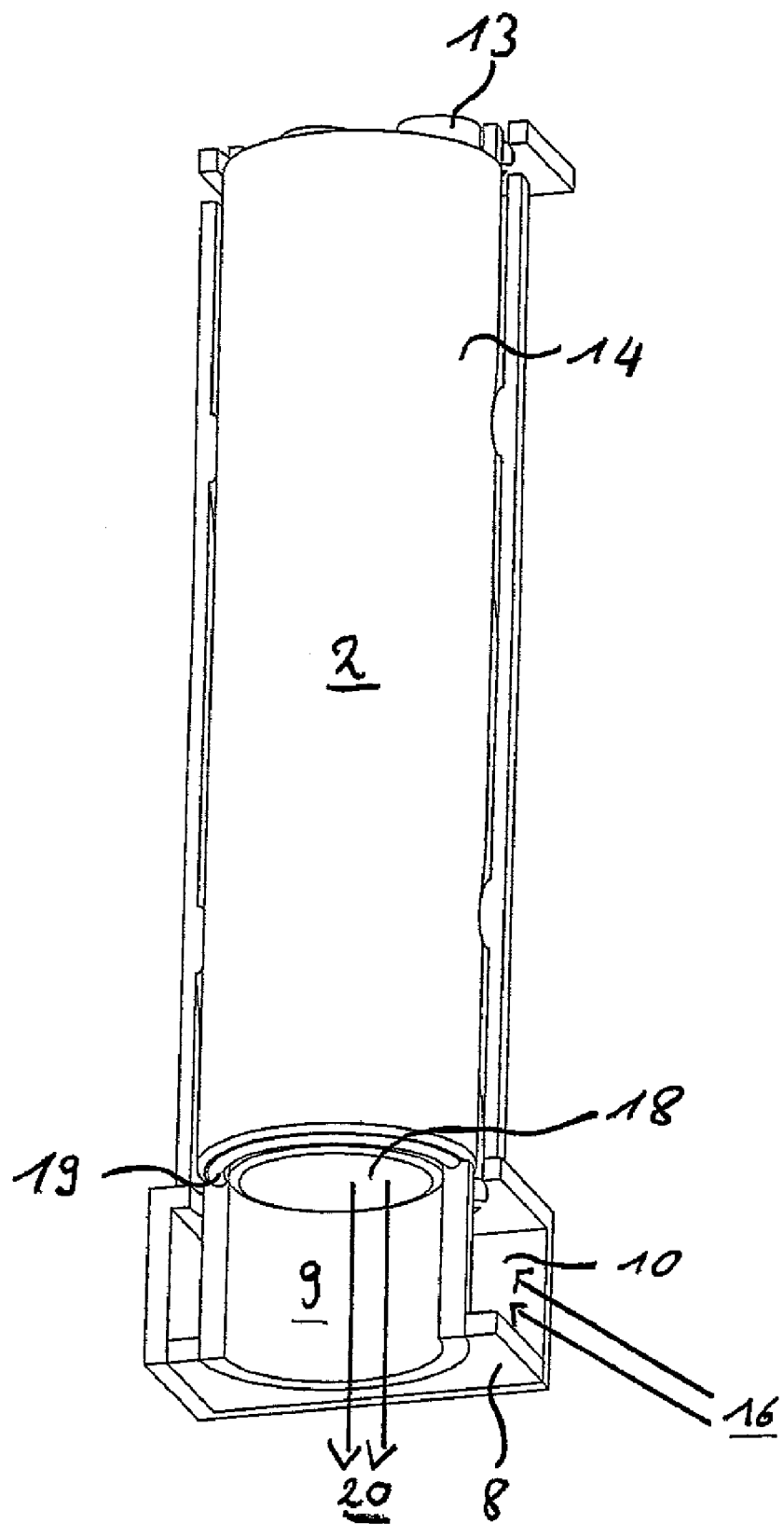

As can be seen from FIG. 4, gas-tight separation from the inlet is provided by the cylindrical casing 9, the base of the cell 2, 18 and the lower plate 8. The base 18 is in the form of a bursting membrane. The bursting membrane acts on the one hand as a gas blow-out valve when the internal gas pressure in the cell 2 rises above a predefined value. Furthermore, the bursting membrane interrupts the electrical line between the negative electrode, which is provided in the cell 2, and the casing 14 or the negative pole 13.

An annular seal 19 is provided between the cell 2 and the cylinder 9 and prevents gas 20 emerging from the cell 2 from entering the area of the inlet 10 and therefore of the channel 7.

Figure 5:
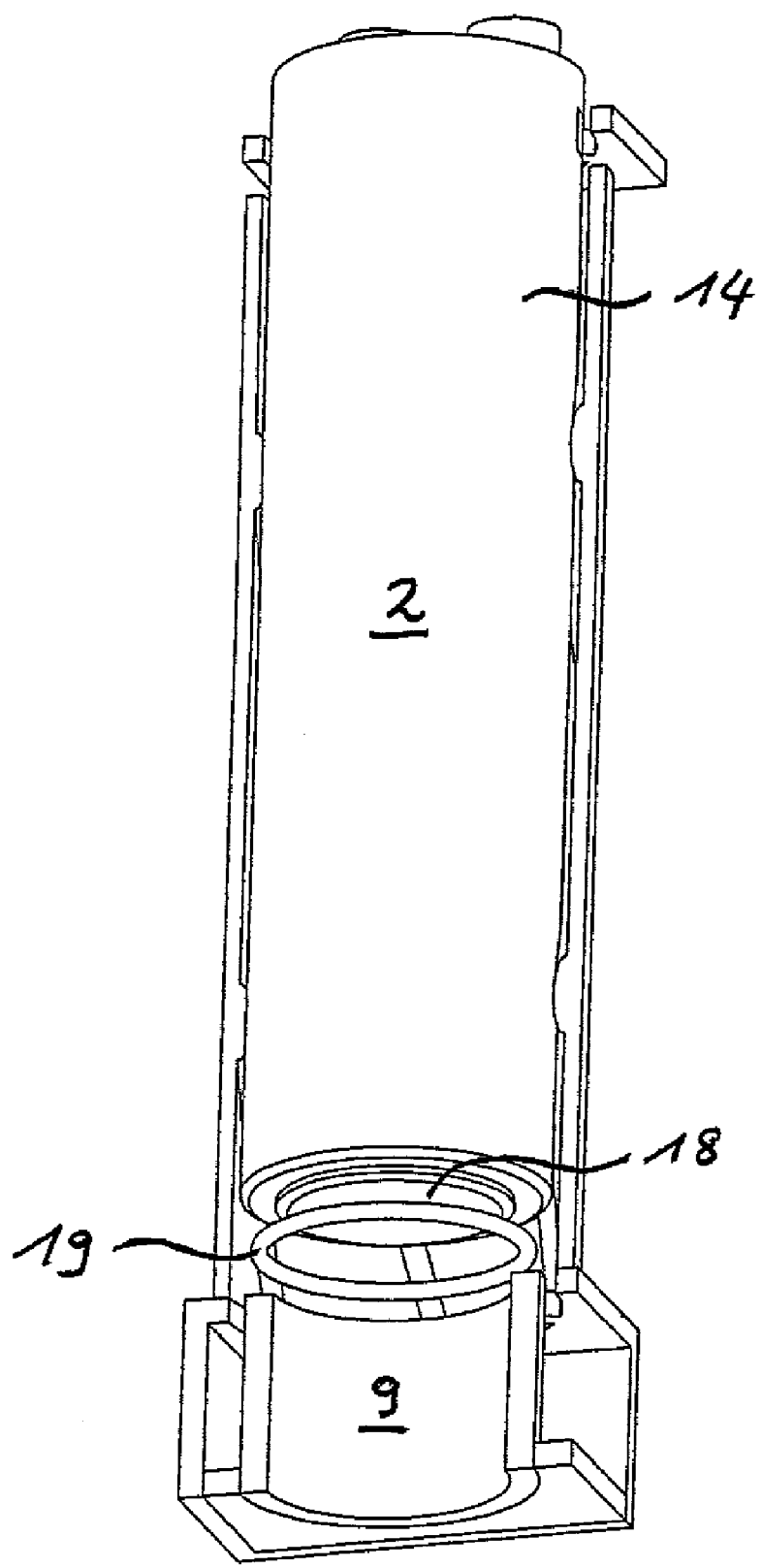

FIG. 5 shows an exploded illustration of the cell 2 from FIGS. 3 and 4, in order to illustrate the arrangement of the seal 19. The base 18 of the cell 2, which is in the form of a bursting membrane, extends to somewhat below the edge of the casing 14. This enlarges the contact area of the seal 19 on the cell 2, thus increasing the effectiveness of the seal. The diameter of the seal 19 is matched to the base 18 such that the seal 19 rests around the base 18 with an accurate fit.

The contact of the seal 19 on the cylindrical casing 9 is increased by the upper edge of the cylindrical casing 19 having a recess 21 in which the seal 19 is located with an accurate fit (FIG. 4).

What is claimed is:

1. An electrochemical accumulator comprising:
a plurality of electrochemical cells provided in a housing that includes:
a cooling air area for routing cooling air around an exterior surface of at least one of the cells; and
a degassing area for holding a gas which emerges from at least one of the cells in the event of a defect;
wherein the cooling air area and the degassing area are physically separated from one another in a gas-tight manner such that the cooling air and the gas may be passed out of the housing independently of one another; and
wherein the cooling air area comprises individual channels provided about the exterior surface of each of the cells; wherein the individual channels are formed between webs.

2. The electrochemical accumulator of claim 1, wherein the electrochemical cells are cylindrical.

3. The electrochemical accumulator of claim 1, wherein the degassing area comprises cylindrical areas which are arranged outside the cells on base surfaces or covering surfaces of the cells.

4. The electrochemical accumulator of claim 1, wherein the cells have bursting openings via which internal areas in the cells are connected to the degassing area such that gas can escape from the internal areas in the cells into the degassing area.

5. The electrochemical accumulator of claim 4, wherein the bursting openings are closed by bursting membranes.

6. The electrochemical accumulator of claim 1, further comprising a support in the housing for supporting the cells in the assembled state.

7. The electrochemical accumulator of claim 1, wherein the cells are lithium-ion cells.

8. The electrochemical accumulator of claim 1, wherein the cooling air flows in a helical shape along the channels.

9. The electrochemical accumulator of claim 1, wherein the cooling air emerges from the channels via outlet slots.

10. The electrochemical accumulator of claim 9, wherein the outlet slots are provided around a top portion of each of the cells.

11. An electrochemical accumulator comprising:
a plurality of electrochemical cells provided within a housing, each of the electrochemical cells having a casing;
a cooling air area comprising individual channels for passing cooling air around the casing of each of the cells; and
a degassing area for holding a gas which emerges from at least one of the cells;
wherein the cooling air area and the degassing area are physically separated from one another in a gas-tight manner such that the cooling air and the gas may be passed out of the housing independently of one another; wherein the channels are formed by webs extending from a top portion of each of the cells to a bottom portion of each of the cells.

12. The electrochemical accumulator of claim 11, wherein the cooling air flows in a helical shape along the channels.

13. The electrochemical accumulator of claim 11, wherein the cooling air exits the channels via outlet slots provided around the top portion of each of the cells.

14. The electrochemical accumulator of claim 11, further comprising air inlets provided in a base located adjacent a bottom portion of the cells.

15. An electrochemical accumulator comprising:
a plurality of electrochemical cells provided within a housing;
a cooling air area comprising individual channels for routing cooling air about an exterior surface of each of the cells; and
a degassing area for receiving a gas which escapes from at least one of the cells;
wherein the cooling air area is physically separated from the degassing area such that the cooling air and the gas may be passed out of the housing independently of one another; wherein the channels are formed by webs extending from a top portion of each of the cells to a bottom portion of each of the cells.

16. The electrochemical accumulator of claim 15, wherein the cooling air flows in a helical shape along the channels.

17. The electrochemical accumulator of claim 15, wherein the cooling air exits the channels via outlet slots provided around a top portion of each of the cells.

* * * * *